(12) United States Patent
Kodialam et al.

(10) Patent No.: US 8,299,900 B2
(45) Date of Patent: Oct. 30, 2012

(54) ANONYMOUS TRACKING USING A SET OF WIRELESS DEVICES

(75) Inventors: Muralidharan S. Kodialam, Marlboro, NJ (US); Wing Cheong Lau, Kwai Chung (HK); Thyagarajan Nandagopal, Edison, NJ (US)

(73) Assignee: Alcatel Lucent, Paris (FR)

( * ) Notice: Subject to any disclaimer, the term of this patent is extended or adjusted under 35 U.S.C. 154(b) by 1375 days.

(21) Appl. No.: 11/824,469

(22) Filed: Jun. 29, 2007

(65) Prior Publication Data

US 2008/0074238 A1 Mar. 27, 2008

Related U.S. Application Data

(60) Provisional application No. 60/847,598, filed on Sep. 27, 2006.

(51) Int. Cl.
*H04Q 5/22* (2006.01)
(52) U.S. Cl. .................................................. 340/10.2
(58) Field of Classification Search ........ 340/10.1–10.5, 340/572.1–572.9; 370/206, 314, 336, 342, 370/345, 458, 445, 448
See application file for complete search history.

(56) References Cited

U.S. PATENT DOCUMENTS

| | | | |
|---|---|---|---|
| 4,398,289 A | 8/1983 | Schoute | 370/348 |
| 5,212,806 A * | 5/1993 | Natarajan | 455/525 |
| 5,506,848 A | 4/1996 | Drakopoulos et al. | 370/336 |
| 6,418,436 B1 | 7/2002 | Degen et al. | 707/6 |
| 6,563,417 B1 * | 5/2003 | Shaw | 340/10.1 |
| 6,859,801 B1 | 2/2005 | Law et al. | 707/3 |
| 7,035,818 B1 | 4/2006 | Bandy et al. | 705/28 |
| 7,095,754 B2 | 8/2006 | Benveniste | 370/465 |
| 7,103,470 B2 | 9/2006 | Mintz | 701/117 |
| 7,486,172 B2 | 2/2009 | Martinez et al. | 340/10.2 |
| 7,675,403 B2 * | 3/2010 | Quan et al. | 340/10.2 |
| 7,684,343 B2 | 3/2010 | Vasil'evich et al. | |
| 2002/0063622 A1 * | 5/2002 | Armstrong et al. | 340/10.31 |
| 2002/0118661 A1 | 8/2002 | Voce | 370/337 |
| 2002/0154653 A1 | 10/2002 | Benveniste | 370/447 |

(Continued)

FOREIGN PATENT DOCUMENTS

JP H11-282975 A 10/1999

(Continued)

OTHER PUBLICATIONS

Japanese Office Action received in JP 2009-530380 dated Oct. 19, 2010.

(Continued)

*Primary Examiner* — Brian Zimmerman
*Assistant Examiner* — An T Nguyen
(74) *Attorney, Agent, or Firm* — Mendelsohn Drucker & Associates, P.C.

(57) ABSTRACT

In one embodiment, a method for estimating the number of tags in a set of tags in a system of tags and readers. The method includes, during each of a plurality of time intervals: (i) transmitting a command requesting that each tag that receives the command determine whether to transmit a reply; and (ii) receiving, in one or more timeslots of a frame corresponding to the time interval, replies from one or more tags. The method further includes providing an estimate of the number of tags in the set of one or more tags based on (i) timeslots in each of the plurality of time intervals that are zero timeslots, i.e., timeslots having no received reply, and (ii) the total number of timeslots in each frame.

15 Claims, 6 Drawing Sheets

U.S. PATENT DOCUMENTS

| | | | |
|---|---|---|---|
| 2003/0214389 A1 | 11/2003 | Arneson et al. | 340/10.1 |
| 2004/0046642 A1 | 3/2004 | Becker et al. | 340/10.32 |
| 2005/0035849 A1* | 2/2005 | Yizhack | 340/5.92 |
| 2006/0044114 A1* | 3/2006 | Friedrich et al. | 340/10.2 |
| 2006/0071758 A1 | 4/2006 | Cooper et al. | |
| 2006/0101168 A1* | 5/2006 | Roh et al. | 710/33 |
| 2006/0208860 A1 | 9/2006 | Park et al. | 340/10.2 |
| 2007/0070896 A1 | 3/2007 | Alapuranen et al. | 370/230 |
| 2007/0075838 A1* | 4/2007 | Powell | 340/10.2 |
| 2007/0096877 A1* | 5/2007 | Quan et al. | 340/10.2 |
| 2007/0126555 A1* | 6/2007 | Bandy | 340/10.2 |
| 2007/0286227 A1 | 12/2007 | Koezuka | 370/445 |
| 2008/0012688 A1 | 1/2008 | Ha et al. | |
| 2008/0150692 A1 | 6/2008 | Missimer et al. | 340/10.1 |
| 2008/0180222 A1* | 7/2008 | Hollister et al. | 340/10.3 |
| 2008/0187002 A1* | 8/2008 | Becker | 370/468 |
| 2008/0187003 A1* | 8/2008 | Becker | 370/468 |
| 2008/0297324 A1 | 12/2008 | Tuttle | |
| 2009/0179738 A1 | 7/2009 | Kageyama | 340/10.1 |
| 2010/0039237 A1 | 2/2010 | Radhakrishnan et al. | |

FOREIGN PATENT DOCUMENTS

| | | |
|---|---|---|
| JP | 2006050049 A | 2/2006 |
| JP | 2006-238381 A | 9/2006 |
| WO | WO 2005/048180 A1 | 5/2005 |

OTHER PUBLICATIONS

Chinese Office Action; Dated Jul. 26, 2011 for corresponding CN Application No. 200780036105.0.

Korean Office Action; Dated Nov. 28, 2011 for the corresponding Korean Application No. 2009-7005243.

Chinese Office Action; Mailed Apr. 23, 2012 for corresponding CN Application No. 200780036105.0.

* cited by examiner

ANONYMOUS TRACKING USING A SET OF WIRELESS DEVICES

CROSS-REFERENCE TO RELATED APPLICATION

This application claims the benefit of the filing date of U.S. provisional application No. 60/847,598, filed on Sep. 27, 2006, the teachings of which are incorporated herein by reference.

BACKGROUND OF THE INVENTION

1. Field of the Invention

The present invention relates to wireless devices, such as radio-frequency identification (RFID) tags, and, in particular, to methods of quickly estimating the cardinality of a dynamically-changing set of wireless devices, i.e., the number of devices in the set, without explicitly identifying the individual devices of the set.

2. Description of the Related Art

Radio-Frequency Identification (RFID) tags are being increasingly used in many applications for identification and tracking purposes. While these devices offer many advantages to consumers, business, and government, privacy advocates have expressed genuine fears that RFID tags can be used for tracking purposes beyond their intended application or life-span. For example, if there is an RFID tag attached to every electronic device carried by a user, such as a cell phone, music player, laptop, etc., then identification of these tags could allow anyone controlling a network of RFID readers to track the owner of the devices within the range of any reader in the network. There have been some efforts by the RFID industry to address these fears by using special-purpose hardware to disable tags on consumer products before such products are received by the consumer. However, such efforts have not been fully endorsed by the industry, primarily due to concerns about practicality and costs.

While individual, unique identification of tagged items may not be desirable, it is indeed desirable, in numerous applications, to gather statistics concerning the aggregates of users. For example, RFID-tagged shoes or wristwatches could be used to keep track of how many people visit certain stores in a shopping mall, without individually identifying each tag, and without individually identifying the consumers transporting the tags. Users are more likely to adopt devices having RFID tags if their privacy and anonymity can be assured, and merchants can also benefit by using the aggregate tracking information. In fact, recipients of tracking data in most applications that track customers using RFID tags do not actually require individual users to be identified, except in rare circumstances.

When a tag population changes with time, an RFID reader probes the tag set at different time instants. Between any two such probes, some tags might have left the current set, while other tags might have entered this set. In such situations, the cardinality of the encountered tag set can be estimated using estimates of the total number of tags that: (a) have entered the system between the two probes, (b) have left the system between two probes, (c) stay in the system for the entire period, and (d) have been probed at least once.

In a spatially-diverse tag population, a reader can read only a subset of tags with each probe, e.g., as in the case of probing items on a long shelf or an airplane flying over a field of sensors while trying to obtain an estimate of the number of active sensors in the field. In such cases, tags could be probed using one or multiple readers. However, without explicit tag-identification schemes (which take a long time to resolve), it is difficult to count the number of all tags in the system in a short period of time. This is because, when certain estimation schemes are used independently at two neighboring locations (or at two neighboring readers) with overlapping ranges, there are some tags that may end up reporting twice. Strict separation between the two tag sets over successive readings might not be able to be ensured due to (1) a highly-varying radio environment, (2) hard-to-control physical orientation and distance between the reader(s) and the tags, and (3) a need to keep the identities of the tags anonymous.

More-complex scenarios occur with both spatial and temporal diversity, wherein it is desirable to track the number of tagged objects that have moved from a first location A to a second location B over a time period between a first time $t_1$ and a second time $t_2$. One such example would be a highway-system grid, wherein various statistics on the traffic patterns on the grid are desired, without uniquely identifying each vehicle. Given estimates of the number of objects in two locations (measured over different times $t_1$ and $t_2$), it is desirable to estimate how many of these objects were at location A at time $t_1$ and at location B at time $t_2$, without explicitly identifying the tag set. Similarly, it would be desirable to have schemes that can be used to track how many attendees participate in any given subset of sessions at a conference by using privacy-preserving tagged labels for each attendee.

Therefore, there are many scenarios where there is a need for anonymous tracking of quantities of tagged objects.

SUMMARY OF THE INVENTION

Problems in the prior art are addressed in accordance with the principles of the present invention in several aspects, by proposing an estimation procedure that can address all of the situations described above. In particular, embodiments of the invention provide a privacy-preserving scheme that enables anonymous estimation of the cardinality of a dynamic set of RFID tags, while allowing the set membership to vary in both the spatial and temporal domains.

First, the present invention provides, in certain embodiments, an asymptotically-unbiased Enhanced Zero-Based (EZB) estimator, which provides estimates of the tags covered by a single reader. Second, the present invention provides, in certain embodiments, a method for using the EZB estimator to track the dynamics of a tag population in spatial and temporal domains. Third, the present invention provides, in certain embodiments, a method to increase the operating range of an EZB estimator and to reduce the total estimation time, when the magnitude of a tag-set population is unknown. Extensive simulation studies that consider a particular application of anonymous people-tracking will then be discussed, and the effectiveness and accuracy of the proposed schemes will be demonstrated.

In one embodiment, the present invention provides a method for estimating the number of tags in a set of one or more tags in a system that includes the set of one or more tags and one or more readers. The one or more readers are adapted to transmit a command requesting that each tag that receives the command determine whether to transmit a reply. Each receiving tag is adapted to determine whether to transmit a reply based on a specified probability level. Each receiving tag that determines to transmit a reply (i) selects a timeslot of a frame in which to transmit the reply based on (1) a specified total number of timeslots in the frame and (2) a specified random-number seed and (ii) transmits the reply in the selected timeslot. The method includes, during each of a plurality of time intervals: (1) transmitting a command requesting that each tag that receives the command determine whether to transmit a reply; and (2) receiving, in one or more timeslots of a frame corresponding to the time interval, replies from one or more tags. The method further includes providing an estimate of the number of tags in the set of one or more tags in the system based on (i) timeslots in each of the plurality of time intervals that are zero timeslots, wherein a zero timeslot is a timeslot having no received reply, and (ii) the total number of timeslots in each frame.

DETAILED DESCRIPTION

Figure 1:
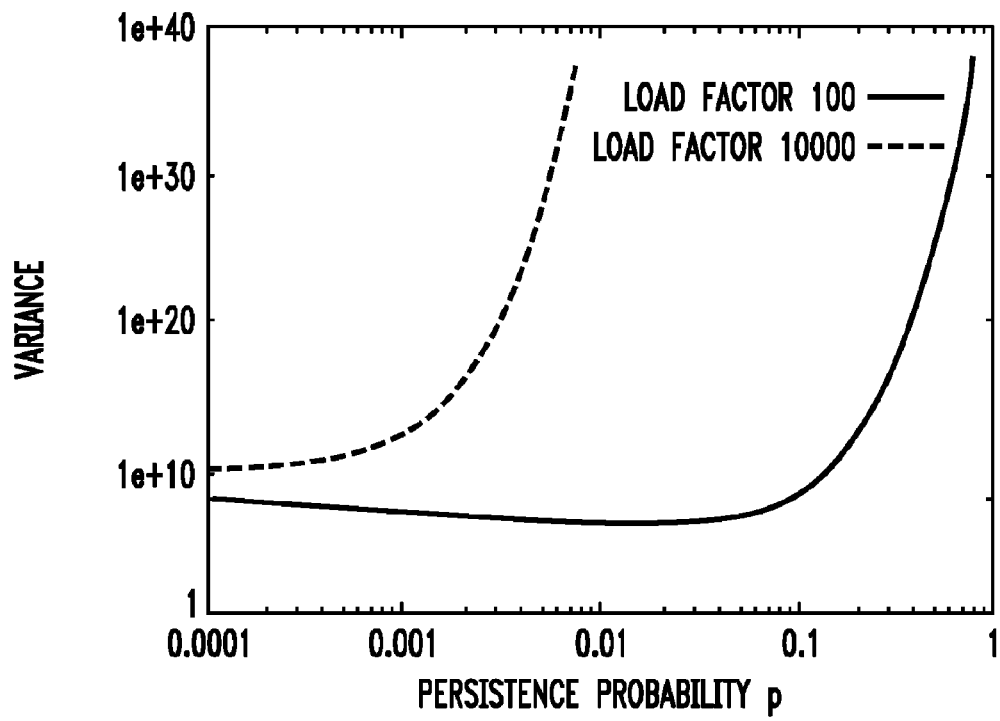
FIG. 1 shows a plot of variance of an Enhanced Zero-Based (EZB) estimator relative to persistence probability for two load factors, in one embodiment of the present invention.

An RFID-tag and system model, in one embodiment of the invention, will now be introduced. Considering a large field of RFID tags and a set of readers, the set of readers could imply multiple readers reading the field at the same time, or alternatively, a single reader sequentially querying the field at different points in space and/or time, or a combination of both. Such a system adopts a "listen-before-talk" model for the RFID tags, wherein the tags "listen" to the reader's request before they "talk" back. In this scenario, even though tags may have their own unique identifiers, it is not of interest to identify tags uniquely.

The range of a reader is defined by the set of RFID tags that are capable of transmitting back to the reader. This is because the reader's transmission radius is assumed to be far greater than a tag's transmission radius, and yet, the reader's usefulness is determined only by the number of tags that it can read.

In a basic ALOHA scheme, as fully described in F. C. Schoute, "Dynamic framed length ALOHA," *IEEE Transactions on Communications*, vol. 31(4), April 1983, the disclosure of which is incorporated herein in its entirety, a reader communicates a frame length to a plurality of tags, and each of the tags picks a particular timeslot in the frame in which to transmit and transmits in that timeslot. The reader repeats this process until all tags have transmitted at least once successfully in a timeslot without collisions.

U.S. patent application Ser. No. 11/525,339, entitled "Estimation Of The Cardinality Of A Set of Wireless Devices," filed on Sep. 22, 2006 and incorporated herein by reference, discloses estimation schemes that guarantee the anonymity of a tag and its corresponding user, while still allowing an RFID reader to estimate the total number of tags within its range. However, a drawback of certain embodiments of these schemes is that all the tags are readable by the reader in a single probe, and the reader should know approximately the magnitude of the number of the tags to be estimated. In practice, the situation is more complex, because the tag population is often spatially and temporally diverse. The tag set can be dynamically changing, sometimes by orders of magnitude. In addition, not all tags might be readable by the reader, such that multiple readers or probes are used to cover all of the tags. Since tags are not uniquely identified in such schemes, some tags could be counted more than once, leading to erroneous estimates.

In a model according to embodiments of the present invention, a reader queries tags using ap-persistent framed-slotted ALOHA model. In this model, the reader sends a frame size f, a persistence probability p, and a random seed R to all tags. Each tag decides whether or not to respond (or "contend") with a probability p, and if it decides to respond, picks a timeslot within the frame and transmits back to the reader in that timeslot. Both of these decisions are based on functions of seed R and the tag's ID. Whenever a tag is given a random seed R and probability p, it will select the same timeslot in a frame of size f, regardless of how many times the experiment is done. One way of effecting this selection is to present the tag with a frame size f, a number $\lceil f/p \rceil$, and a random seed R, where the notation $\lceil \ \rceil$ indicates the function "smallest integer not less than." The tag selects a random number s uniformly distributed between 1 and $\lceil f/p \rceil$ and transmits in timeslot s only if $s \leq f$. While there are many ways to implement p-persistence, the following assumptions will be made herein. Tags are assumed not to be able to sense the channel, and hence, can merely transmit in the chosen timeslot. Timeslot synchronization is assumed to be provided by the reader's energizing-probe request. Tags are assumed to respond with a bit or a sequence of bits, which enables the reader to detect that a transmission has occurred. It is further assumed that the reader cannot distinguish between a collision and a successful transmission but does have the ability to detect an empty timeslot. This detection can be done by evaluating the signal-to-noise ratio (SNR) at each timeslot, and the likelihood of successfully detecting an empty timeslot will increase as the size (or "length") of the timeslot (i.e., the number of bits in the tag response) increases. While interference from nearby readers can theoretically be resolved by using a synchronization protocol between readers, this issue will not specifically be considered herein, although such synchronization protocols could be used in conjunction with embodiments of the present invention.

The entire system uses a single wireless channel/band for operation. The system-load factor is the ratio of the number of distinct tags in the entire system to the frame size, while the reader-load factor, $\rho = t_i/f$ is the ratio of the number $t_i$ of tags that can respond to an ith query (by a reader) to the frame size. It is noted that the term "load factor" and the variable $\rho$ are used herein to represent both system-load factor and reader-load factor, which should be evident by the particular context. It is assumed that the frame size is constant across all readers in the system.

The tag-identification problem, also referred to as "collision resolution" or "conflict resolution," will not be considered herein, since embodiments of the present invention instead seek to provide a reliable estimate of the cardinality of a tag set in as little time as possible, and to use this estimate for anonymous tracking of tags.

Since an estimation scheme consistent with embodiments of the present invention is probabilistic in nature, the accuracy requirement for the estimation process is specified using two parameters: an error bound $\beta$, $\beta > 0$, and a failure probability $\alpha$, $0 < \alpha < 1$.

Given a set of t tags in the system and a frame with f timeslots, each reader query i (representing the persistence probability $p_i$ and random seed R), when applied to a subset of the tags, triggers a response $B_i$ from the tag subset. The value of $B_i$ is composed of f timeslots, where each timeslot is either a zero (implying that no tag transmitted to the timeslot) or a 1 (implying that at least one tag transmitted to the timeslot). A timeslot in which no tag transmits a response is referred to as a "zero timeslot." It is assumed that all the tags in the system are queried using M reader queries, with each tag queried at least once.

The problem to be solved is the following. Given responses $B_i$, i=1, 2, ..., M, from M queries, the total number of tags in the system is to be estimated with an confidence interval of width $\beta$, i.e., the goal is to obtain an estimate $\hat{t}$ such that $$\frac{\hat{t}}{t} \in \left(1 - \frac{\beta}{2}, 1 + \frac{\beta}{2}\right),$$

with probability p greater than $\alpha$. In other words, maximum error should be at most $$\pm \frac{\beta t}{2},$$

with probability p greater than $\alpha$. Additionally, the distribution of tags is to be computed as between the various subsets, i.e., the cardinality of each tag subset, as well as the cardinality of the intersection of various sets, are to be computed.

Typically, in order to achieve a specified accuracy level, multiple measurements are made. The performance is measured in terms of the total number of timeslots, summed over all of the measurements.

For example, given a 5,000-square-meter warehouse floor with a large number of RFID-tagged items organized in rows and a reader that can read all tags within 5 meters, it might be desirable to obtain an estimate of the number of tagged items within ±1% of the actual number of tags with a probability greater than 99.99%, as quickly as possible. In addition, the number of tags in each row might desirably be estimated. Assuming that measurements can be made on successive days, it might further be desirable to obtain an estimate, within a ±1% error bound, of the number of tagged items that were in the warehouse on both days.

The variable $Z_\alpha$ is used herein to denote a percentile for a unit normal distribution. If $\alpha = 99\%$, then $Z_\alpha = 2.33$. A normal distribution with mean a and variance b is denoted by N[a,b].

The estimation of a static tag set with a single reader, using a cardinality estimation procedure that represents an improvement over the Probabilistic-Zero Estimator (PZE) algorithm disclosed in U.S. patent application Ser. No. 11/525,339, discussed above, will now be described. In this new algorithm, the estimates are asymptotically unbiased.

In an EZB-estimation procedure, it is assumed that all tags in the set are within the reader's range, and thus, the system-load factor and reader-load factor are the same. It is desirable to estimate the cardinality of this set of tags when the reader queries all of the tags, given that the load factor is approximately known. This scheme will be further developed below, and a description will be provided of how this scheme can be extended to combine multiple queries on potentially-overlapping tag sets in order to obtain cardinality estimates over multiple queries.

The reader probes the tags with frame size f persistence probability p, and random seed R. All tags in the reader's range decide to transmit with a probability p, and if transmitting, pick a timeslot j in the frame uniformly at random and transmit in that timeslot. If Z is a random variable representing the number of timeslots in the frame with no transmission, then it can be seen that $E[Z] \approx f e^{-p\rho}$, where $\rho = t/f$. The following Theorem 1 states that Z can be approximated as a normal distribution:

Theorem 1: If each of t tags chooses a slot randomly from among f slots and transmits in that slot with probability p, then $Z \sim N[\mu_0, \sigma_0^2]$, where $\mu_0 = f e^{-p\rho}$, $\sigma_0^2 = f e^{-p\rho}(1 - (1 + p^2 \rho)e^{-p\rho})$.

If $z_i$ is the number of empty timeslots that are observed by the reader in a particular query i, then the reader performs n queries on the tag set (using different random seeds), and $z_i$, i=1, 2, ..., n, empty timeslots in each query i are observed. Therefore, the following Theorem 2 can be stated:

Theorem 2: Let t tags each pick a slot randomly among f slots in each frame i=1, 2, ..., n and transmit in the chosen slot with probability p. Let $Z_i$ be the random variable representing the number of slots with no transmissions in frame i. If $$Y = \frac{\sum_{i=1}^{n} Z_i}{n}$$

then, $$Y \sim N[\mu_0, \sigma_0^2/n]$$

where $\mu_0$ and $\sigma_0$ are given in Theorem 1.

The reader computes the estimate $t_0$ of tag-set size t based on $$y = \sum_i z_i / n.$$

From Theorems 1 and 2, it can be seen that the expected number of empty timeslots is $f e^{-p\rho}$, or that the fraction of empty timeslots is $e^{-p\rho}$. From the current measurement, the reader observes that the fraction of empty timeslots is y/f. Equating the expected value and the observed value, the reader now determines $\rho_0$ that solves $$e^{-p\rho_0} = \frac{y}{f} = \frac{\sum_i z_i}{f} \quad (1)$$

and sets $t_0$ to $f \rho_0$.

The foregoing Equation (1) defines a new Enhanced Zero-Based (EZB) estimator that is different from a PZE estimator, which derives the estimate from each $z_i$ and then takes the average of the estimates. A PZE estimator has a constant additive bias for all values of n, whereas an EZB estimator is typically asymptotically unbiased.

Since $\mu_0$ is a continuous, monotonically-decreasing function of t, the function $\mu_0$ has an inverse function denoted by g( ), i.e., $g(\mu_0(t))=t$. The following Theorem 3 applies regarding the mean and variance of estimator g( ):

Theorem 3

$$\text{Given } g(Y) = -f \log(Y/f),$$

$$E[g(Y)] = t + \frac{(e^{p\rho} - (1 + p^2 \rho))}{2np^2}$$

$$\text{Var}[g(Y)] = \frac{f(e^{p\rho} - (1 + p^2 \rho))}{np_2} = \delta_0$$

As $n \to \infty$, $E[g(Y)] \to t$.

When load factor $\rho$ is high ($\rho > 50$), the variance expression can also be rewritten as $$\delta_0 = \frac{t^2}{nf} \left( \frac{e^{p\rho} - 1}{p^2 \rho^2} - \frac{1}{\rho} \right) \approx \frac{t^2}{nf} \left( \frac{e^{p\rho} - 1}{p^2 \rho^2} \right). \quad (2)$$

FIG. 1 illustrates a plot of the variance of an EZB estimator relative to probability for two load factor values, $\rho=100$ and $\rho=10,000$, with $f=100$ and $n=1$. As shown, for a given load factor, there is a narrow range of probabilities for which the variance is low.

Figure 2:
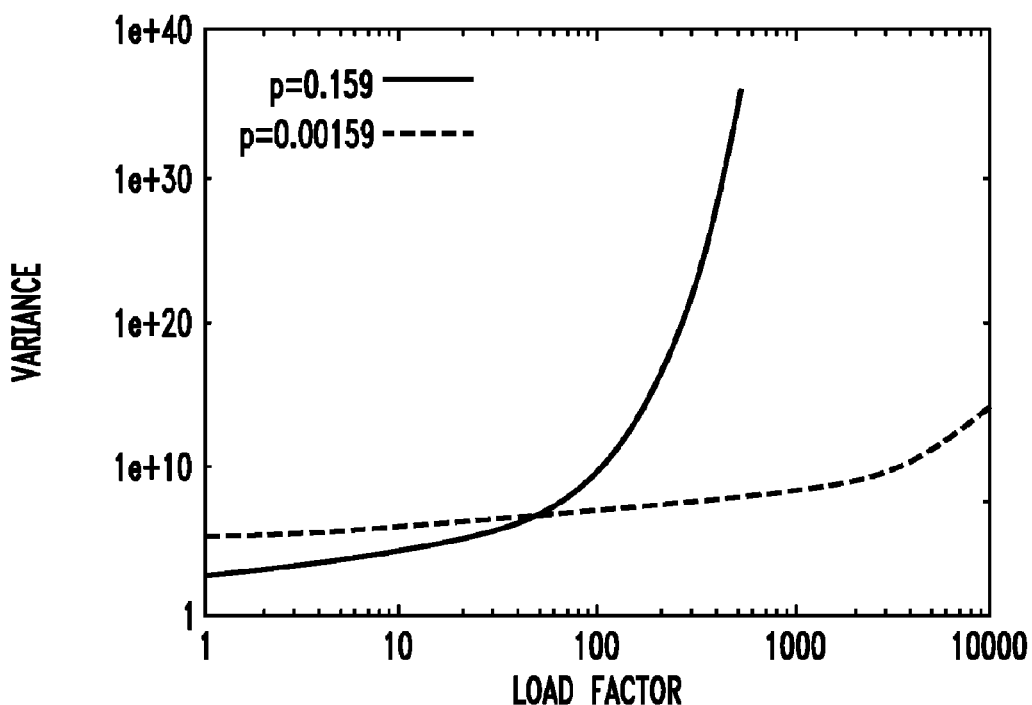
FIG. 2 shows a plot of variance of an EZB estimator relative to load factor for two values of persistence probabilities, in one embodiment of the present invention.

FIG. 2 illustrates a plot of the variance of an EZB estimator relative to load factor for 10 two values of persistence probabilities, $p=0.159$ and $p=0.00159$. As shown, the dependency of variance on the load factor has a highly asymmetrical nature.

Ideally, given a load factor $\rho$, a persistence probability p should be selected so as to minimize the variance, rather than increasing n. By differentiating $\delta_0$ with respect to p and numerically solving the resultant expression, it can be shown that, given a load factor of $\rho$, the variance of an EZB estimate is minimized when $p\rho=1.59$. In other words, for minimum variance, an optimal probability p* should be set to:

$$p^* = \min\left(1, \frac{1.59}{\rho}\right). \quad (3)$$

In FIG. 1, the probabilities shown are optimal for load factors $\rho=100$ (p*=0.0159) and $\rho=10000$ (p*=0.000159).

The optimal persistence probability is a function of the load (and therefore, the size of the tag set). This presents a conundrum, since it is the tag-set size that is to be estimated. When the tag-set size is estimated incorrectly, then the variance will not be minimum. Moreover, even if the variance is at a minimum, it might not be sufficient to achieve the desired accuracy.

If the variance of an EZB estimate (based on an estimate $\hat{t}$) is higher than the desired value, then one way to reduce it is to obtain independent estimates by presenting a different seed, frame size, and/or persistence probability to the tags. Thus, each set of parameters results in a different experimental estimate, and the outcomes of these experiments are independent of one other. The following Theorem 4 can be used to combine the estimates:

Theorem 4

Let $e_1, e_2, \ldots e_k$ be k estimates for t with variances $v_1, v_2, \ldots, v_k$. For any set $\{a_i\}$ with $0 \le a_i \le 1$ and $\sum_i a_i = 1$, $$\sum_{i=1}^{k} a_i e_i \text{ is an estimator for } t \text{ with variance}$$

$$\sum_{i=1}^{k} a_i^2 v_i. \text{ The optimal choice of } a_i \text{ that minimizes}$$

the variance of the linear combination is $a_i =$ $$\frac{\frac{1}{v_i}}{\sum_{i=1}^{k} \frac{1}{v_i}} \text{ and the minimum variance is } 1 \bigg/ \sum_{i=1}^{k} \frac{1}{v_i}.$$

An EZB estimator is a powerful tool to compute the cardinality of a set anonymously in a fast and efficient manner. For example, a population of 10,000 tags can be estimated with 5% error in only 2000 timeslots. Assuming a timeslot length of 5 bits, at most 10,000 bits are used to estimate the cardinality within ±250 tags. A tag population of this size will employ an identifier of length greater than 14 bits, which implies that, if an ideal scheme were used (with perfect scheduling and no overhead), which relied on each tag transmitting its unique ID for counting, then the ideal scheme would be at least 14 times slower than an EZB estimator, in addition to possibly violating tag anonymity and privacy requirements through disclosure of the unique tag IDs.

An EZB estimator also spans a wide range of operation by suitable selection of persistence probability p and frame size f. Specifically, an EZB estimator can efficiently estimate very low cardinalities as well as very high cardinalities, in stark contrast to the prior-art LogLog counting scheme, as disclosed in Durand et al., "LogLog Counting of Large Cardinalities," *European Symposium on Algorithms*, Hungary, September 2003 (incorporated herein by reference), which fails for low cardinalities.

The terms "Enhanced Zero-Based estimator" and "EZB estimator" will generally be used hereafter to refer to a specific combination of frame size f probability p, and random seed R, as applied to Equation (1). It should be understood, however, that these terms include the particular implementations and embodiments explicitly described herein, as well as other possible implementations and embodiments.

The estimation of multiple overlapping tag sets will now be described. An EZB estimator was previously described in the context of the measurement of the cardinality of a single set of tags. Of particular interest is the use of an EZB estimator to measure multiple sets of tags, with some tags belonging to more than one set. For the estimation of multiple sets of tags, it is noted that a tag's choice of timeslot in a frame of size f is governed by seed value R sent by the reader to the tag. As long as seed value R, probability p, and frame size f remain the same, the tag will always pick the same timeslot in the frame. This is akin to, e.g., a seed value input to the pseudo-random functions in the ANSI C library. When a tag belongs to multiple sets, as long as the sets are queried using the same seed, probability, and frame size, the tag will pick the exact same timeslot for transmission in each query.

Considering an estimation problem with K sets to be queried, in order to query each set, an EZB algorithm is used with the same arguments (frame size, probability, and seed) supplied to each set. Since all sets are queried with the same parameters, each tag that belongs to multiple sets selects the same timeslot in the query response for each of those sets.

For a query of a given set $K_i$ with frame size f, with the size of the total tag set being $|T|=t$, the response of the query on this set can be represented as a binary bit vector, $B_i$, where the individual components (timeslots) have a value of either 0 or 1, with a value of 1 representing a transmission by at least one tag (success or collision). It is useful to examine the qth component (timeslot) of two response vectors $B_i$ and $B_j$, i.e., $B_i(q)$ and $B_j(q)$. A goal is to evaluate what the resultant vector would be if a single query were applied to $\hat{K}=K_i \cup K_j$, simply by using vectors $B_i$ and $B_j$. If $B_i(q)=0$ and $B_j(q)=0$, then it is implied that no tag in $\hat{K}$ has selected timeslot q, i.e., $\hat{B}(q)=0$. On the other hand, if either $B_i(q)$ or $B_j(q)$ is equal to 1, then it is implied that at least one tag in $\hat{K}$ has transmitted, and so $\hat{B}(q)=1$. Thus, the resultant bit vector for union set $\hat{K}$ is simply the bit-wise OR of $B_i$ and $B_j$, as shown in the following Table I, which shows combined results vectors from multiple sets:

TABLE I

| $K_1$ | $K_2$ | ... $K_i$ | $\hat{K} = K_1 \cup K_2 \cup ... \cup K_i$ |
|---|---|---|---|
| 0 | 0 | ... 0 | 0 |
| 1 | 0 | ... 0 | 1 |
| 0 | 1 | ... 0 | 1 |
| 0 | 0 | ... 1 | 1 |
| 0 | 1 | ... 1 | 1 |
| 1 | 1 | ... 1 | 1 |

From $\hat{B}$, $B_i$, $B_j$, the cardinality of sets $\hat{K}$, $K_i$, $K_j$, respectively, can be estimated using an EZB estimator, as described above. The set relation $|A \cup B|=|A|+|B|-|A \cap B|$ can then be used to compute $|A \cap B|$, $|A \setminus (A \cap B)|$, and $|B \setminus (A \cap B)|$.

As noted above, the accuracy of an estimator increases when multiple probes (using a different seed for each probe) are performed on each tag set, and when probes with identical frame sizes, persistence probabilities, and random seeds are combined for different sets.

In the following Table II, the performance of an EZB scheme is shown for an experiment involving the estimation of the cardinality of the union and the intersection of two sets of tags A, B, with 6,000 elements each, for various values of the intersection set. In this scenario, an EZB estimator is characterized by a frame size of 512 timeslots and a probability of 0.0678 (which correspond to t=12,000 tags). The second row of Table II shows the actual values of the intersection and the union, and the other rows show the estimates after n experiments. The desired error bound is set to $\beta 8=0.05$, which implies that all estimates should be within $\beta t/2=300$ tags of the actual values. It can be seen from Table II that, even with just 10 experiments, much better estimates are obtained than what might be minimally desirable, for a wide-range of sizes of intersection and union sets.

TABLE II

| Probes | |A ∩ B| | | | |A ∪ B| | | |
|---|---|---|---|---|---|---|---|
| (Actual:) | 600 | 1200 | 4000 | 11400 | 10800 | 8000 |
| 10 | 588 | 1172 | 3955 | 11244 | 10879 | 7999 |
| 20 | 682 | 1256 | 4002 | 11423 | 10800 | 8067 |
| 50 | 699 | 1151 | 3997 | 11323 | 10924 | 8029 |

The case of varying load factors in different sets will now be considered. An EZB estimator can provide incorrect estimates when the number of tags in the set to be measured varies by a larger factor (e.g., a factor of nearly an order of magnitude or more) than that for which the estimator is designed. This can be seen in FIG. 2, from the high variance of the estimate for p=0.159, when the presented load is higher that the optimal load factor, $\rho=10$. If the number of tags is expected to vary widely between sets, then, in order to compute the cardinality of the union or intersection, the probabilities should be selected more carefully.

According to the scheme described above for estimating multiple overlapping tag sets, the frame sizes are kept the same. Similarly, when an attempt is made to combine two resultant bitmaps from probes performed on two different sets, the underlying assumption in the computation is that all tags in the intersection behave identically for both probes. Thus, the persistence probability should also be the same for both probes.

One approach to tackle this problem is to probe each of the sets multiple times using different persistence probabilities, to account for the range of tags that might be expected to be found in the sets. This approach, i.e., multi-resolution probing in the case of unknown loads, will now be explained.

In real-life situations, the number of tags in the field is unknown. While multiple measurements can be performed on the tag set by adaptively varying the probabilities and then finding the optimal probability, this might not be desirable when multiple sets are to be combined because, as noted above, the probabilities should be matched between any two sets in order to compute the cardinality of the intersection and union sets. The frame size also should be constant for this same reason.

The problem to be addressed is as follows. Each set that is probed at a given time by a reader can have a tag-set size ranging from $t_l$ to $t_u$, $t_l \leq t_u$. There can be K such sets that are to be measured. Moreover, once a set is measured, it might not be possible to revisit that particular set later in order to obtain further measurements, since the tags and/or the reader may be mobile. If the only measurement of interest were the cardinality of the union of all these sets, then the net population to be measured would vary from $Kt_l$ to $Kt_u$. However, if finding the intersection of any combination of sets out of the K sets is of interest, then the tag population of interest can vary from $t_l$ to $Kt_u$, which can cover a wide range. For example, if $t_l=10$, $t_u=1000$, and K=1000, then the estimation process should be able to provide accurate estimates for a population size that can range from 10 to $1 \times 10^6$.

The problem of effectively measuring an unknown load in a single set will now be considered. Given an upper bound $t_u$ and lower bound $t_l$ on the number of tags that can be encountered in the set, the problem is to determine the values of frame size f, persistence probability p, and the number of experiments/probes that should be performed in order to obtain an accurate estimate. If the error of the estimate $|t-\hat{t}|$ is within $\pm \beta t/2$, then the inequality $Z_\alpha \sqrt{\delta_0} \leq \beta t$ can be used, where $\delta_0$ is the variance of a single estimate given by Equation (2).

The foregoing inequality can be rewritten as:

$$\delta_0 \leq \frac{\beta^2 t^2}{Z_\alpha^2}.$$

The expression for $\delta_0$ can be substituted from Equation (2), resulting in the following constraint on the number of experiments performed for a given number of tags within $[t_l, t_u]$:

$$n \geq \frac{Z_\alpha^2}{\beta^2} \frac{1}{f} \left( \frac{e^{p\rho}-1}{p^2 \rho^2} \right). \quad (4)$$

Figure 3:
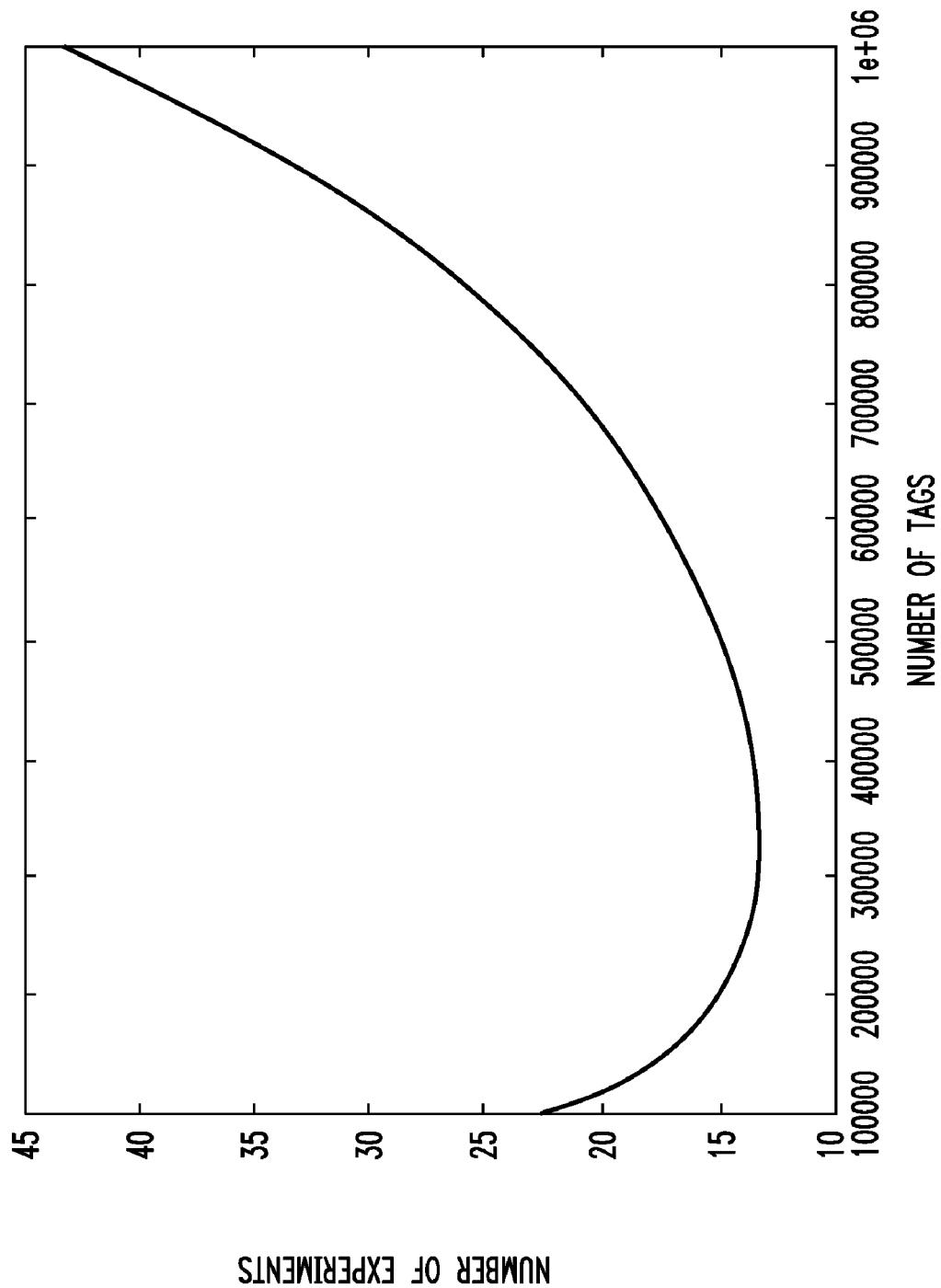
FIG. 3 shows a plot of the right-hand side of Equation (4), with a given set of estimator parameters for a given range, in one embodiment of the present invention.

FIG. 3 shows a plot of the right-hand side of Equation (4), with a given set of estimator parameters (probability p=0.001024 and frame size f=256) for a range $[t_l, t_u] = [10^4, 10^5]$. It can be seen that, when the probability is optimized such that n is minimized for a value within the tag range $[t_l, t_u]$, the number of experiments performed increases monotonically on both sides of the minimum and reaches its peaks at both $t_l$ and $t_u$. It is desirable that the number of experiments performed for a given accuracy level be the same throughout the range $[t_l, t_u]$, especially at $t_l$ and $t_u$ (it is noted that the number of experiments increase more steeply for larger values of t). To this end, the following constraint applies:

$$\frac{Z_\alpha^2}{\beta^2}\frac{1}{f}\left(\frac{e^{p\rho_l}-1}{p^2\rho_l^2}\right) = \frac{Z_\alpha^2}{\beta^2}\frac{1}{f}\left(\frac{e^{p\rho_u}-1}{p^2\rho_u^2}\right),$$

where $\rho_l = t_l/f$ and $\rho_u = t_u/f$. If r is given a value of $t_l/t_u$, then the above equation can be simplified as:

$$(e^{p\rho_u})^r - 1 = r^2(e^{p\rho_u} - 1). \quad (5)$$

The range of an EZB estimator is determined by the maximum number of tags that will result in no empty timeslots with a probability of less than 1−θ. It is desirable that both endpoints of the estimation range, $t_u$ and $t_l$, be within the operating range. This is achieved by first accommodating $t_u$ within the operating range of an EZB estimator. Second, by satisfying Equation (5), $t_l$ will also fall within the operating range.

The following Lemma 1 is applicable in this scenario:

Lemma 1. Let t tags each pick a timeslot randomly from among f timeslots and transmit in that timeslot. Let t, f→∞ while maintaining t/f=ρ. Then, the number $N_0$ of empty timeslots approaches a Poisson random variable with parameter $\lambda_0 = fe^{-\rho}$, and the number $N_1$ of singleton timeslots (timeslots with only one tag transmitting therein) is distributed approximately as a Poisson random variable with parameters $\lambda_1 = f\rho e^{-\rho}$, where $\rho = t/f$ is the load factor.

Generalizing the result of Lemma 1, it can be shown that $$Pr[N_0 = 0] = e^{-\lambda_0},$$

where $\lambda_0 = fe^{-pp}$. Therefore, $\lambda_0 \leq -\log(1-\theta)$. If θ is set to a value of θ=0.99, then $\lambda_0 \leq 5$. Thus, to ensure that $t_u$ is within the operating range of the estimator, the following is set to be true:

$$\lambda_0 = fe^{p\rho_u} = fe^{pt_u/f} \leq 5. \quad (6)$$

The above expression is treated as an equality and substituted into Equations (4) and (5) to yield $$\frac{Z_\alpha^2}{\beta^2 f}\frac{\left(\frac{f}{5}-1\right)}{\left(\log\frac{f}{5}\right)^2} \leq n, \quad (7)$$

$$\left(\frac{f}{5}\right)^r - r^2\left(\frac{f}{5} - 1\right) - 1 = 0, \quad (8)$$

respectively.

Since the value of r is known, Equation (8) can be solved for frame size f. This provides the minimum frame size used in order to ensure that the operating range of the estimator includes both $t_u$ and $t_l$.

After solving for f, the minimum number n of experiments to perform can be determined from Equation (7), and probability p can also be computed from Equation (6), thereby providing all three of the arguments used by an EZB estimator to provide estimates within $[t_l, t_u]$.

It is noted that using the approximation in Equation (2) leads to values of f and n that are dependent only on the ratio $r = t_l/t_u$, which is extremely desirable, even though this approximation is valid only for large load factors. When the load factors are small, the optimal values of f and n will be functions of both r and $t_u$. The above method can be used, substituting the exact expressions (instead of the approximations) for the variance, to compute the exact values for low load factors. It is further noted that the results derived using the approximation are still an upper bound on the values of n and f and therefore, are an upper bound on the total time nf taken to estimate the tag population.

The following Table III shows the computed optimal probe parameters for various tag-population ranges, with an error limit of 5% (i.e., β=0.05). The "Total" column refers to the total estimation time over all experiments in terms of the number of response timeslots, ignoring probe overhead. As shown, when the upper range is ten times the lower range, the computed values are the same for f and n, leading to the same total estimation time, regardless of $t_l$ and $t_u$. At the same time, it can also be seen that the smaller the value of r, the larger the total estimation time nf, and that nf increases linearly as r decreases.

TABLE III

| Lower $t_l$ | Upper $t_u$ | Scale r | Prob. p | Frame f | Expt n | Total nf |
|---|---|---|---|---|---|---|
| 100 | $10^3$ | 0.1 | 0.938 | 242 | 29 | 7018 |
| 100 | $10^4$ | 0.01 | 1.0 | 3370 | 11 | 37070 |
| 100 | $10^5$ | $10^{-3}$ | 1.0 | 45550 | 6 | 273300 |
| $10^3$ | $10^4$ | 0.1 | 0.0938 | 242 | 29 | 7018 |
| $10^3$ | $10^5$ | 0.01 | 0.219 | 3370 | 11 | 37070 |
| $10^3$ | $10^6$ | $10^{-3}$ | 1.0 | 45550 | 6 | 273300 |
| $10^4$ | $10^5$ | 0.1 | 0.00938 | 242 | 29 | 7018 |
| $10^4$ | $10^6$ | 0.01 | 0.0219 | 3370 | 11 | 37070 |
| $10^5$ | $10^6$ | 0.1 | 0.000938 | 242 | 29 | 7018 |

The problem of optimizing an EZB estimator for very large tag-population ranges will now be considered. While measuring large numbers K of tag sets, it is desirable to be able to effectively measure any tag-set cardinality ranging from $[t_l, Kt_u]$, as noted above. This problem is similar to the problem of estimating a tag-population range with a very small value of $r' = t_l/t'_u$ discussed above, if $t'_u$ is set to a value of $t'_u = Kt_u$.

One of the observations from Table III is that the total number of response timeslots used to estimate a given range increases linearly with decreasing r. This is inconvenient for two reasons: (i) the frame sizes become larger and larger, which might not be feasible for many RFID systems, and (ii) the total estimation time is extremely high for large ranges.

In order to eliminate this problem, the possibility of splitting the range is considered. In this scenario, the range $[t_l, t'_u]$ is split into m smaller ranges, and an estimator is used for each sub-range, with the estimator for each sub-range i having its own arguments $<f_i, p_i, n_i>$ to achieve an error within a factor of β in its sub-range. The minimum-variance combining method described in Theorem 4 is used to obtain the net estimate of any tag-set size in the entire range $[t_l, t'_u]$.

Using this method, the total number of experiments will be $$\sum_{i=1}^{m} n_i.$$

There is a potential to reduce the total number of experiments performed, since the variance of an EZB estimator grows super-linearly beyond a certain threshold, as can be seen in FIG. 2. Since the estimator parameters for a range are characterized only by the ratio of lower and upper bounds on the tag populations, dividing the range equally on a logarithmic scale is considered. For example, $[10,10^5]$ ($r=10^{-4}$) can be divided into two ranges, $[10,10^3]$ and $[10^3,10^5]$ with r=0.01.

In general, given a range $[t_l,t_u]$ with $r=t_l/t_u$ and m sub-ranges, each sub-range will have $$r' = \sqrt[m]{r}.$$

Since r' is identical for each of these m sub-ranges, the optimal values of f and n will also be the same across the sub-ranges, with only probability p varying for each sub-range—all computed using Equations (6), (7), and (8). Thus, the total number of timeslots used for an estimation error of at most $\pm\beta t/2$ in $[t_l,t_u]$ is given by nfm.

The approach is therefore as follows. For a given range parameter r and desired error bound $\beta$, for each value of m=1, 2, ..., $r' = \sqrt[m]{r}$ is found, and f and n are computed as a function of r'. The total number of timeslots used, i.e., nfm, is then computed for each value of m. The value of m that results in the least number of timeslots to estimate the entire range of tags $[rt_u,t_u]$ is selected. The following Table IV shows optimal numbers of sub-ranges, i.e., the number m of sub-ranges that minimizes the total number of timeslots for an error bound of $\beta$ for various values of r.

TABLE IV

| Range r | Sub-Ranges m | Frame f | Expt n | Total nfm |
|---|---|---|---|---|
| 0.1 | 1 | 242 | 29 | 7018 |
| 0.01 | 2 | 242 | 29 | 14036 |
| $10^{-3}$ | 3 | 242 | 29 | 21052 |
| $10^{-4}$ | 5 | 145 | 38 | 27550 |

The difference in the total number of timeslots used for a given range, as between Table III and Table IV, should be noted. This difference shows that splitting a range into smaller sub-ranges enables the estimation process to complete faster. Each order of magnitude increase in the operating range uses only 7,000 additional timeslots, a constant increase. In fact, using the parameters of the Philips I-Code system, described fully at Philips Semiconductors, "I-CODE Smart Label RFID Tags," http://www.semiconductors.com/acrobat_download/other/identification/SL092030.pdf, the disclosure of which is incorporated herein by reference in its entirety, a rate of 4000 timeslots per second can be achieved for estimation purposes, which implies that less than 2 seconds of additional time is taken to estimate an order of magnitude more tags.

When the variance approximation expression is not used, then, as mentioned above, the optimal values of n and f are not only dependent on r', but also on the actual value of the upper bound $t_u$ for each sub-range. In addition, when the range is split into smaller sub-ranges, estimates near the boundaries of each sub-range can be made more accurate by using the variance-combining technique shown in Theorem 4. Thus, computing the optimal number of sub-ranges and then identifying the minimum number of timeslots to be used is much more complex, but could be beneficial for smaller load factors.

An exemplary application of the schemes described above will now be illustrated using an example of anonymous tracking of attendees at a conference, and the performance of an EZB estimator will be investigated. Considering a major conference such as COMDEX, E3 Expo, etc., which typically attracts tens of thousands of participants, it is assumed that the conference has 100 vendor booths and that the conference lasts two days. Of interest is obtaining the following various statistics regarding the number of participants: (a) the number of participants who visit a particular booth over both days of the conference, (b) the number of participants who visited a particular booth on each day, and (c) the number of participants who are on the conference floor at a given point in time. It is desirable for these statistics to be accurate within 5% of the actual value ($\beta=0.05$), and thus, there are 200 sets of interest to be measured.

The true number of participants is set to be 50,248. Each booth is assumed to receive at least 50 visitors on a given day. Therefore, the estimator range should be $[t_l,t_u]=[50, 50000]$, i.e., r=0.001. According to Table IV, this range is divided into 3 smaller sub-ranges, each with r'=0.1. Hence, for each booth, three estimators are used, for the ranges [50, 500], [500, 5000] and [5000, 50000], respectively, with the <n,p,f> values for each range calculated accordingly using Equations (6), (7), and (8).

Each experiment is conducted using a different random seed. Moreover, in order to obtain the bitmap for an entire day for a given booth, the three estimators can sample periodically (e.g., every few minutes), and then the union (bit-wise OR of bitmaps) of all these measurements at the end of the day can be taken, thereby providing the end-of-the-day bitmap for each booth. (Since statistics over a granularity of less than a day are not desired in this example, only end-of-the-day measurements are taken. If finer-grained statistics, e.g., over an hour, are desired, then aggregation can be done over an hour, assuming $t_l$ is specified appropriately.) After two days, the set-union and intersection algorithms described above with respect to estimating multiple overlapping tag sets are executed, to obtain the union and intersection for all of the desired statistics.

Figure 4:
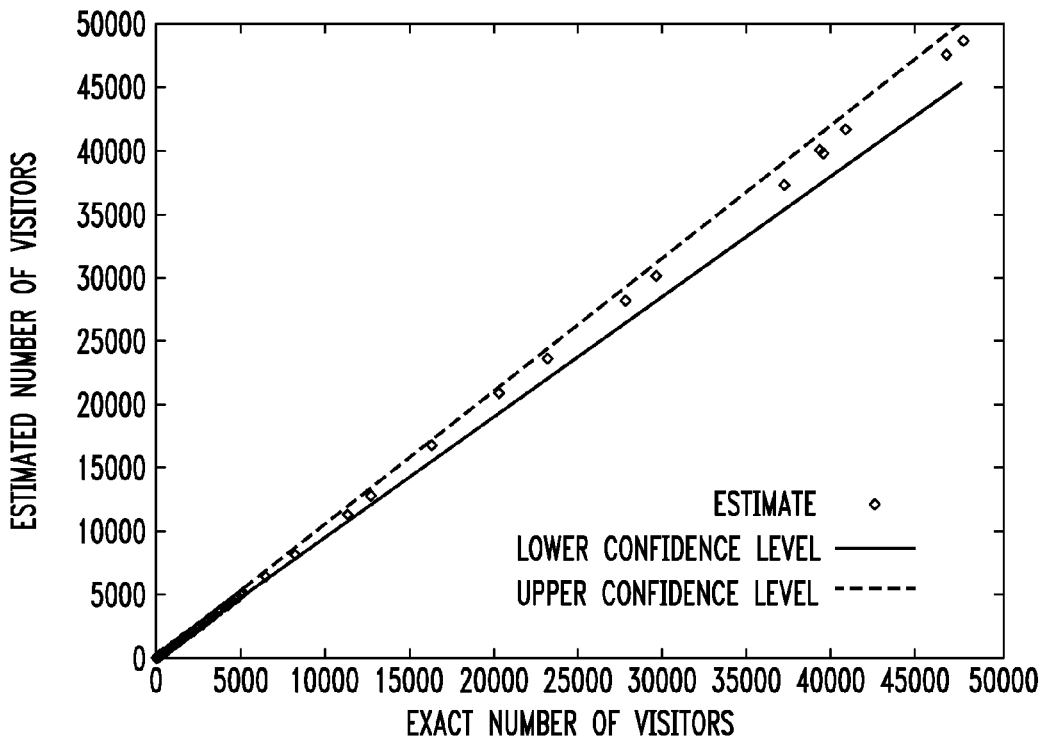
FIG. 4 shows the estimated number of visitors at each booth for each conference day relative to the actual number of visitors, in an exemplary application of one embodiment of the present invention.
Figure 5:
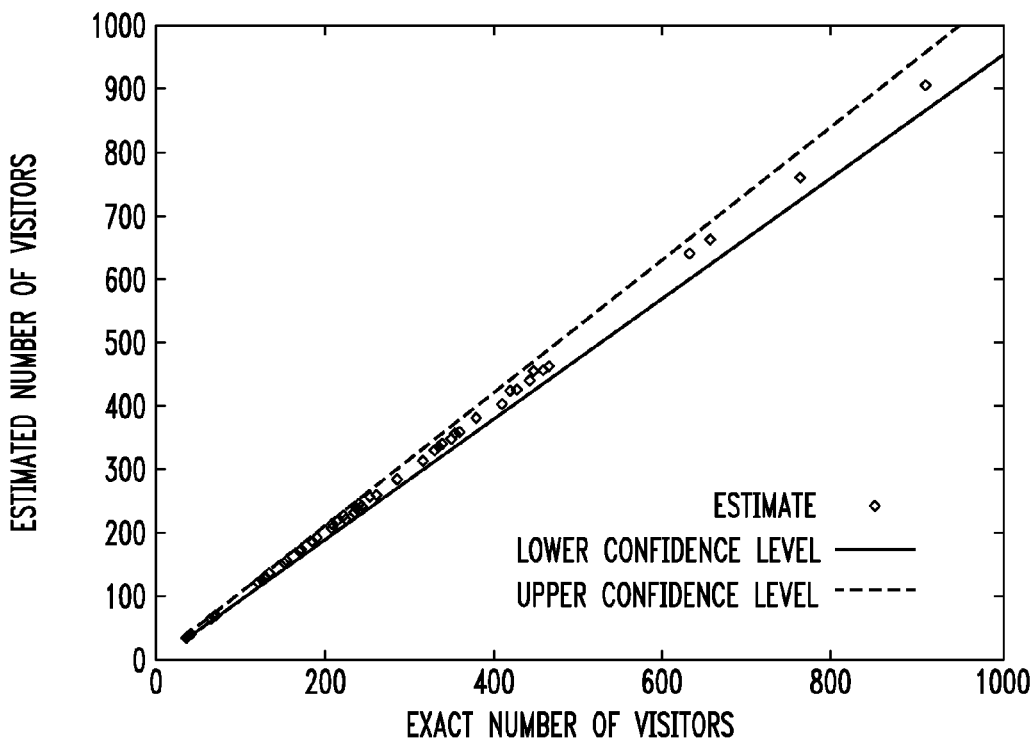
FIG. 5 is a magnified portion of FIG. 4.

The estimate for the total number of participants was 50,392, which is well within 1% of the actual figure. FIG. 4 shows the estimated number of visitors at each booth for each day (200 estimates in all), relative to the actual number of visitors. The upper and lower confidence intervals ($\pm2.5\%$) are also shown in FIG. 4. These estimates at the lower end of the spectrum are shown as magnified in FIG. 5. It is noted that the estimates are well within the error bounds.

Figure 6:
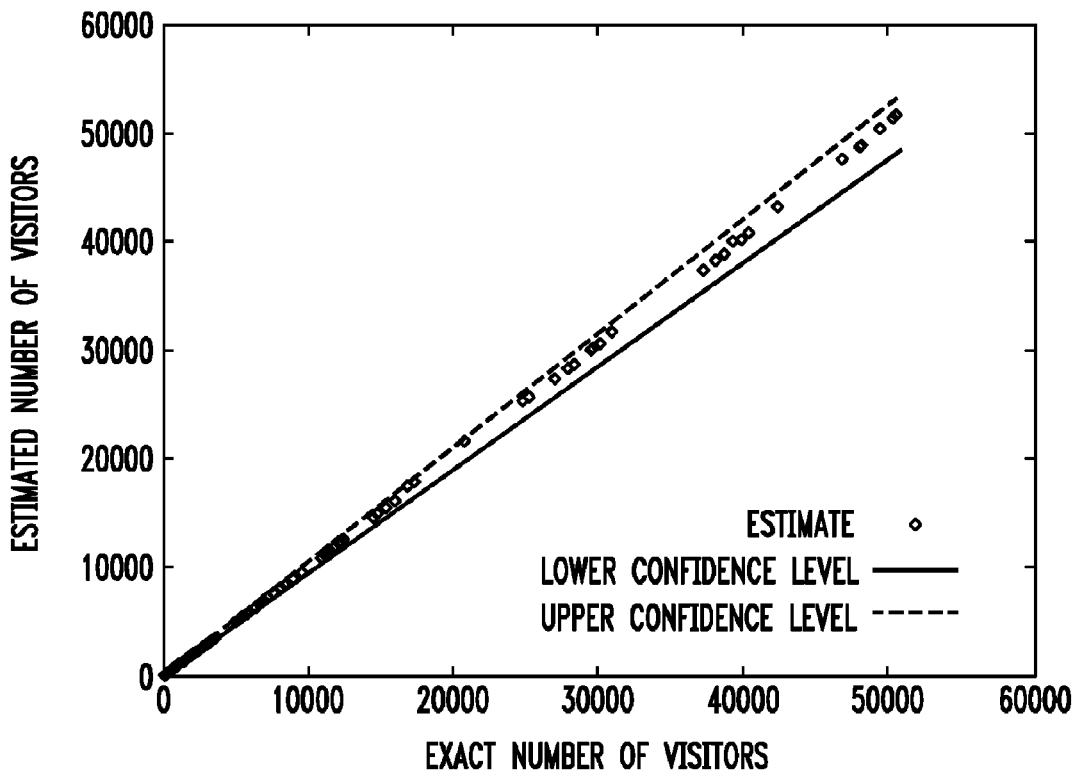
FIG. 6 is a plot showing the total number of visitors attending a given booth over both conference days, along with confidence intervals, in an exemplary application of one embodiment of the present invention.
Figure 7:
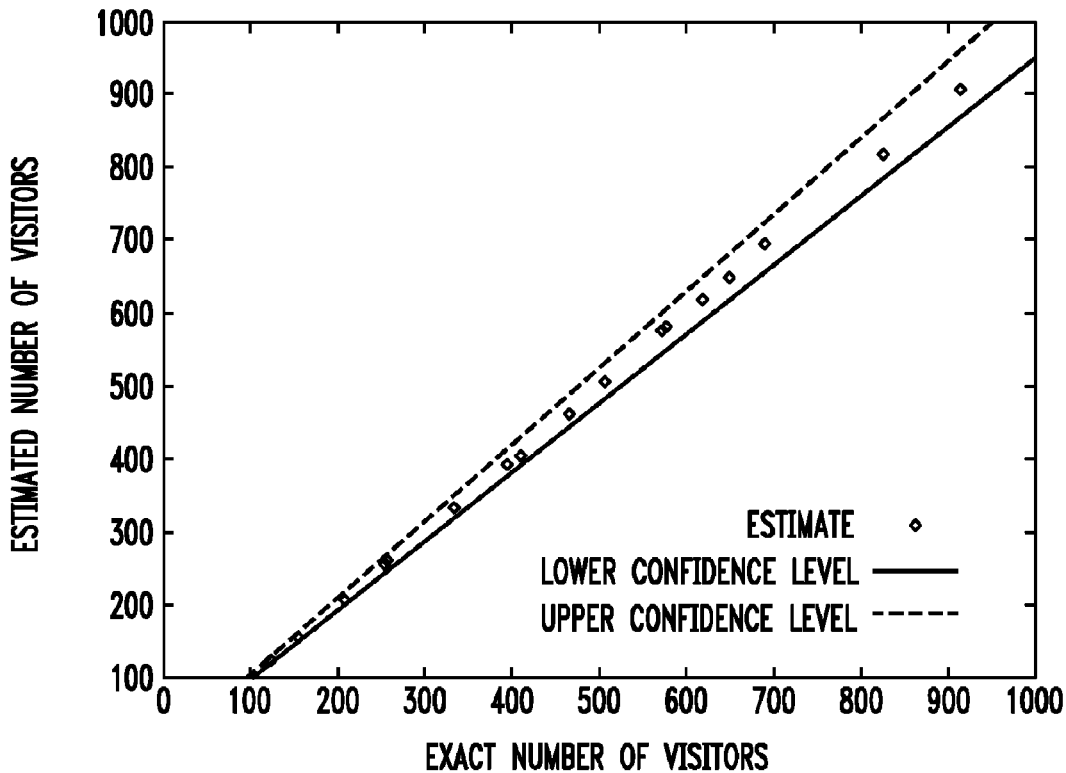
FIG. 7 is a magnified portion of FIG. 6.

In FIG. 6, the total number of visitors attending a given booth over both days is shown, along with the confidence intervals. A magnified version of the portion of the plot closest to the origin is shown as magnified in FIG. 7. Once again, it can be seen that the performance of the scheme exceeds the desired accuracy.

Figure 8:
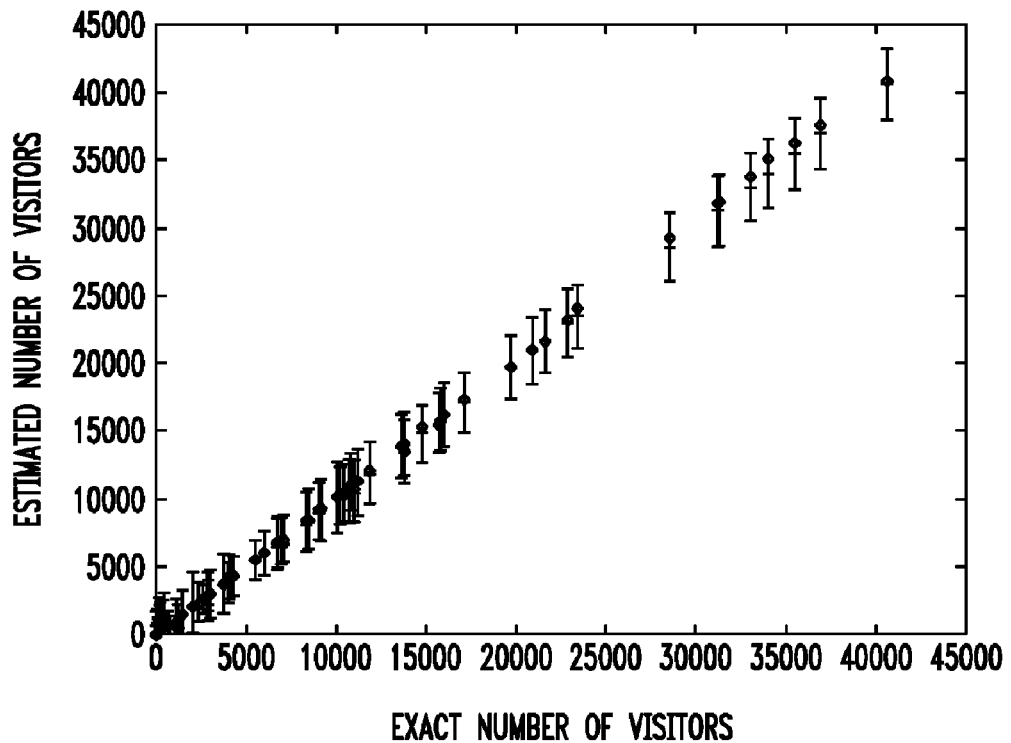
FIG. 8 is a plot showing the estimated number of visitors who attend a particular booth on both conference days, along with the upper and lower bounds for the estimate, in an exemplary application of one embodiment of the present invention.
Figure 9:
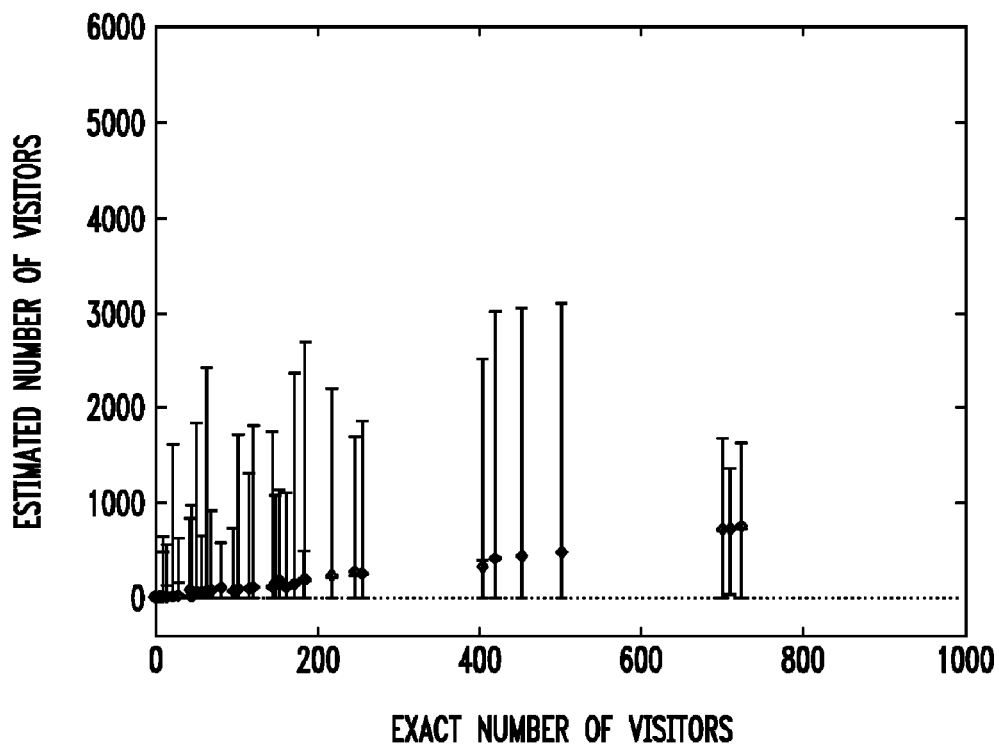
FIG. 9 is a magnified portion of FIG. 8.

Estimating the number of visitors who attend a particular booth on both days (the intersection problem) will now be considered. FIG. 8 shows this number along with the upper and lower bounds for the estimate, within the 5% bound of the total estimate. Since each set cardinality is estimated within 5%, if the intersection size is less than 5% of the total, then the values will not be accurate. The mid-point of the error bar in FIG. 8 is the actual desired value. Magnified values for the booths with the smallest number of common visitors over both days are shown in FIG. 9. It can be seen from FIGS. 8 and 9 that the intersection estimates are also quite close to the true values, particularly when the estimates are large. Although the intersection estimates are not as close to the true values when the estimates are small, the estimates are still well within the error bounds.

Thus, it has been shown that a proposed EZB estimator performs exceedingly well in the foregoing scenario and can handle a large range of operation, with only a logarithmic increase in estimation time.

Therefore, embodiments of the present invention address the problem of anonymous tracking of users or objects using RFID tags. A new EZB estimator is disclosed, which performs well both theoretically and experimentally. In order to perform estimation accurately over an entire range of operation, a multi-resolution scheme has been developed, which provides a desired level of accuracy over the entire operating range. The performance of an EZB estimator has been demonstrated both theoretically, as well as in simulations.

Figure 10:
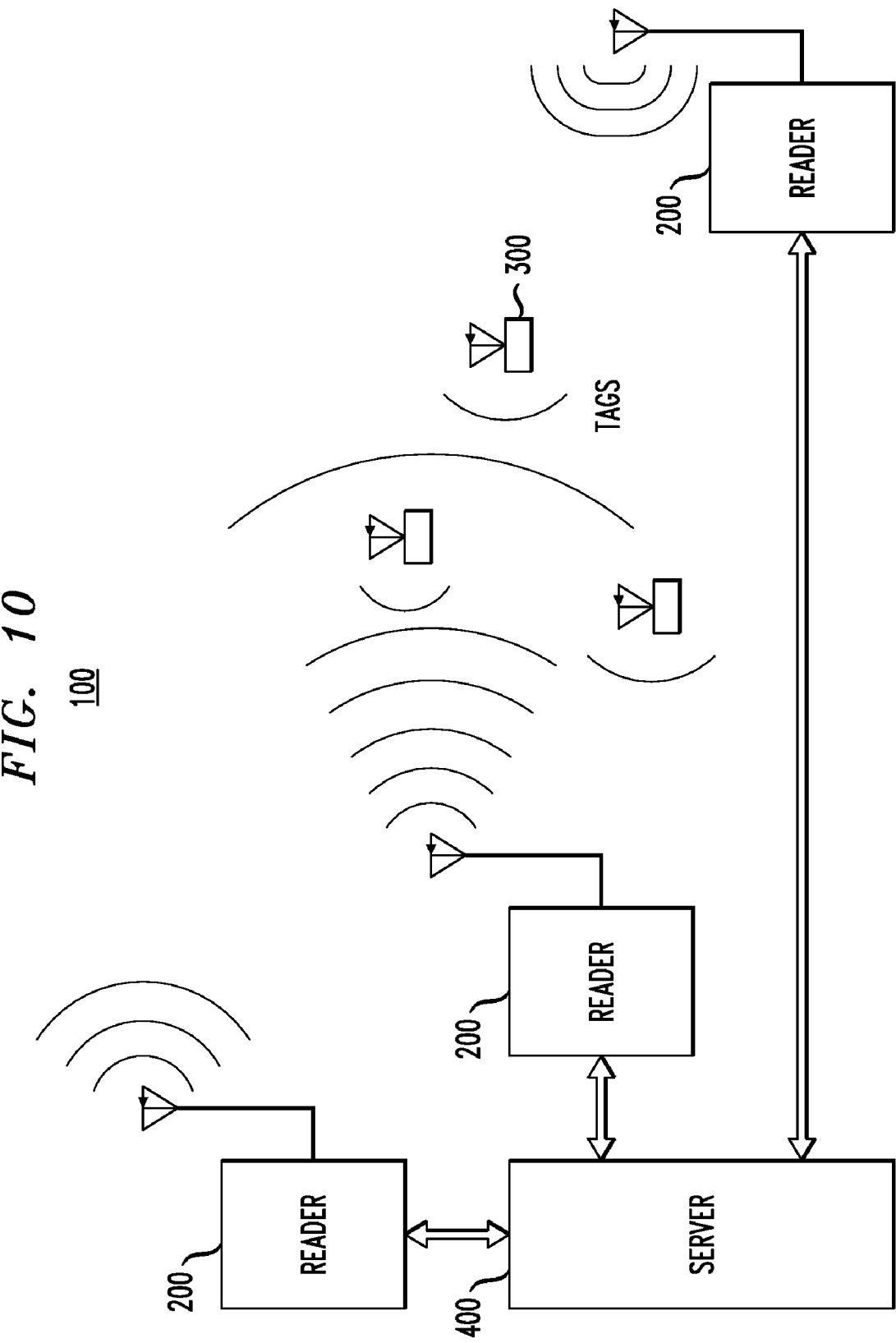
FIG. 10 illustrates an exemplary RFID system, in one embodiment of the invention.

FIG. 10 illustrates an exemplary RFID system 100, including readers 200 and a plurality of tags 300 in selective communication with one or more of readers 200. A computer, such as server 400, is configured to perform the estimation methods based on data exchanged with the reader. While system 100 depicts an RFID system that might be used in performing one or more of the estimation methods of the present invention, as described herein, it should be understood that other systems are possible, such as those including other numbers of tags and/or readers. It should also be understood that, while a server, computer, or other processing device may be used to perform one or more of the estimation methods of the present invention, as described herein, such estimation methods may alternatively or additionally be performed by one or more of the readers themselves.

It should be understood that, while the present invention is described in terms of RFID tags and readers, the invention has utility in other applications in which estimation of the cardinality of a set of objects is performed. For example, the methods described herein could possibly have utility in estimating a cardinality of either wired or wirelessly-networked elements, such as electronic product-code (EPC) tags, nodes on a computer network, mobile telephone devices in a given range, customer loyalty cards or identification devices in a store, or even molecules, particles, biological organisms, or cells that exhibit particular responsive behaviors in a given environment. Modes of communication other than radio-frequency communications, e.g., infrared communications, could alternatively be used. The broad terms "reader" and "tag" should be understood to include not only RFID readers and RFID tags, respectively, but also other devices performing the same or similar functions in RFID applications or in other applications, such as the exemplary applications set forth in this paragraph.

It should be recognized that the invention has applicability to both "smart" or active tags and "dumb" or passive tags, and that the "probing" of a tag, as mentioned herein, may include (i) energization of the tag and (ii) transmission of data to the tag, but does not necessarily include both of these functions, e.g., in the case of active tags that are self-powered, no energization of the tag is necessary.

The term "random" in the context of selection or number generation, as used herein, should not be construed as limited to pure random selections or number generations, but should be understood to include pseudo-random, including seed-based selections or number generations, as well as other selection or number generation methods that might simulate randomness but are not actually random, or do not even attempt to simulate randomness.

It is also possible that, in certain embodiments of the present invention, an algorithm could be used wherein certain tags are instructed not to respond to a probe at all, under certain circumstances. For example, in certain embodiments, systems employing an estimator consistent with embodiments of the present invention could employ tags that are adapted not to transmit any response if the computed random number provided by the reader exceeds a given threshold value.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for estimating the cardinality of a set of one or more tags in a system that comprises the set of one or more tags and one or more readers, wherein:
    the one or more readers are adapted to transmit a command requesting that each tag that receives the command determine whether to transmit a reply;
    each receiving tag is adapted to determine whether to transmit a reply based on a specified probability level; and
    each receiving tag that determines to transmit a reply (i) selects a timeslot of a frame in which to transmit the reply based on (1) a specified total number of timeslots in the frame and (2) a specified random-number seed and (ii) transmits the reply in the selected timeslot;
the method comprising:
    (a) during each of a plurality of time intervals:
        (a1) transmitting a command requesting that each tag that receives the command determine whether to transmit a reply; and
        (a2) receiving, in one or more timeslots of a frame corresponding to the time interval, replies from one or more tags; and
    (b) providing an estimate of the cardinality of the set of one or more tags in the system based on (i) timeslots in each of the plurality of time intervals that are zero timeslots, wherein a zero timeslot is a timeslot having no received reply, and (ii) the total number of timeslots in each frame',
    wherein the estimate $t_0$ of the cardinality of the set of one or more tags in the system in step (b) is calculated using at least: (i) the total number f of timeslots in each frame, (ii) the probability p that a tag will reply in a timeslot, (iii) a load factor $\rho_0$ defined as a ratio of a number of tags to frame size, and (iv) the number $z_i$ of zero timeslots for time interval i,
    wherein the estimate $t_0$ of the cardinality of the set of one or more tags in the system in step (b) is derived using the equations $$e^{-p\rho_0} = \frac{\sum_i z_i}{f}, \text{ and } t_0 = f\rho_0.$$

2. The invention of claim 1, wherein:
    step (a) further comprises, during each of a plurality of time intervals, (a3) determining a number of zero timeslots in the frame; and
    step (b) provides the estimate of the cardinality of the set of one or more tags in the system based on (i) a sum of the numbers of zero timeslots for the plurality of time intervals and (ii) the total number of timeslots in each frame.

3. The invention of claim 1, wherein the command comprises (1) the specified probability level, (2) the specified total number of timeslots in the frame, and (3) the specified random-number seed.

4. The invention of claim 1, wherein the value of $p\rho_0$ is selected to minimize variance of the estimate of the cardinality of the set of one or more tags in the system.

5. The invention of claim 1, wherein different random-number seeds are used during at least two different time intervals.

6. The invention of claim 1, wherein the same total number of timeslots in each frame, probability level, and random-number seed are used during at least two different time intervals.

7. The invention of claim 1, further comprising:
    (c) performing steps (a) and (b) a plurality of times to generate a plurality of cardinality estimates; and
    (d) providing a modified cardinality estimate based on the plurality of cardinality estimates.

8. The invention of claim 7, wherein step (d) comprises applying one or more of a union operation, an intersection operation, and a difference operation to the plurality of cardinality estimates.

9. The invention of claim 7, wherein:
    step (c) is performed one or more times for a first tag-set size bound by a first set of upper and lower limits; and
    step (c) is performed one or more times for a second tag-set size bound by a second set of upper and lower limits.

10. The invention of claim 1, wherein an optimal number n of time intervals in the plurality of time intervals is selected using the equation $$n \geq \frac{Z_\alpha^2}{\beta^2} \frac{1}{f}\left(\frac{e^{p\rho}-1}{p^2\rho^2}\right), \text{ wherein:}$$

f is the total number of timeslots;
p is the probability that a tag will reply in a timeslot;
$\rho$ is a load factor;
Z is the number of zero timeslots in a given frame;
$\alpha$ represents a failure probability; and
$\beta$ represents an error bound.

11. The invention of claim 1, wherein an optimal number of timeslots f is selected using the equations $$\frac{Z_\alpha^2}{\beta^2 f} \frac{\left(\frac{f}{5}-1\right)}{\left(\log\frac{f}{5}\right)^2} \leq n,$$

$$\left(\frac{f}{5}\right)^r - r^2\left(\frac{f}{5}-1\right) - 1 = 0, \text{ wherein:}$$

Z is the number of zero timeslots in a given frame;
n is the number of time intervals;
$\alpha$ represents a failure probability;
$\beta$ represents an error bound;

the size of the tag set is bound by upper and lower limits $t_l$, $t_u$, respectively; and r is a ratio of $t_l/t_u$.

12. A system for estimating the cardinality of a set of one or more tags in a system that comprises the set of one or more tags and one or more readers, wherein:

the one or more readers are adapted to issue a command requesting that the tags issue a reply to identify themselves, the command including (i) timing information defining a total number of timeslots for the reply, (ii) a probability that a tag will reply in a given timeslot, and (iii) a random-number seed; and in response to the command, one or more of the tags is adapted to (i) select a timeslot in which to reply to the command and (ii) issue the reply in the selected timeslot;

the system adapted to:

(a) during each of a plurality of time intervals:
  (a1) issue a command;
  (a2) receive, in one or more timeslots, replies from the one or more tags; and
  (a3) determine the number of zero timeslots corresponding to the time interval, wherein a zero timeslot is a timeslot identified as having no tags transmitting therein during the time interval in reply to the command; and (b) provide an estimate of the cardinality of the set of one or more tags in the system based on (i) a sum of the number of zero timeslots across the plurality of time intervals and (ii) the total number of timeslots, wherein the estimate $t_0$ of the cardinality of the set of one or more tags in the system in step (b) is calculated using at least: (i) the total number f of timeslots in each frame, (ii) the probability p that a tag will reply in a timeslot, (iii) a load factor $\rho_0$ defined as a ratio of a number of tags to frame size, and (iv) the number $z_i$ of zero timeslots for time interval i, wherein the estimate $t_0$ of the cardinality of the set of one or more tags in the system in step (b) is derived using the equations $$e^{-p\rho_0} = \frac{\sum_i z_i}{f}, \text{ and } t_0 = f\rho_0.$$

13. A non-transitory machine-readable medium, having encoded thereon program code, wherein, when the program code is executed by a machine, the machine implements a method for estimating the cardinality of a set of one or more tags in a system that comprises the set of one or more tags and one or more readers, wherein:

the one or more readers are adapted to issue a command requesting that the tags issue a reply to identify themselves, the command including (i) timing information defining a total number of timeslots for the reply, (ii) a probability that a tag will reply in a given timeslot, and (iii) a random-number seed; and in response to the command, one or more of the tags is adapted to (i) select a timeslot in which to reply to the command and (ii) issue the reply in the selected timeslot;

the method comprising:

(a) during each of a plurality of time intervals:
  (a1) issuing a command;
  (a2) receiving, in one or more timeslots, replies from the one or more tags; and
  (a3) determining the number of zero timeslots corresponding to the time interval, wherein a zero timeslot is a timeslot identified as having no tags transmitting therein during the time interval in reply to the command; and (b) providing an estimate of the cardinality of the set of one or more tags in the system based on (i) a sum of the number of zero timeslots across the plurality of time intervals and (ii) the total number of timeslots, wherein the estimate $t_0$ of the cardinality of the set of one or more tags in the system in step (b) is calculated using at least: (i) the total number f of timeslots in each frame, (ii) the probability p that a tag will reply in a timeslot, (iii) a load factor $\rho_0$ defined as a ratio of a number of tags to frame size, and (iv) the number $z_i$ of zero timeslots for time interval i, wherein the estimate $t_0$ of the cardinality of the set of one or more tags in the system in step (b) is derived using the equations $$e^{-p\rho_0} = \frac{\sum_i z_i}{f}, \text{ and } t_0 = f\rho_0.$$

14. A method for estimating the cardinality of a set of one or more tags in a system that comprises the set of one or more tags and one or more readers, wherein:

the one or more readers are adapted to transmit a command requesting that each tag that receives the command determine whether to transmit a reply;

each receiving tag is adapted to determine whether to transmit a reply based on a specified probability level; and each receiving tag that determines to transmit a reply (i) selects a timeslot of a frame in which to transmit the reply based on (1) a specified total number of timeslots in the frame and (2) a specified random-number seed and (ii) transmits the reply in the selected timeslot;

the method comprising:

(a) during each of a plurality of time intervals:
  (a1) transmitting a command requesting that each tag that receives the command determine whether to transmit a reply; and
  (a2) receiving, in one or more timeslots of a frame corresponding to the time interval, replies from one or more tags; and (b) providing an estimate of the cardinality of the set of one or more tags in the system based on (i) timeslots in each of the plurality of time intervals that are zero timeslots, wherein a zero timeslot is a timeslot having no received reply, and (ii) the total number of timeslots in each frame, wherein:

the estimate $t_0$ of the cardinality of the set of one or more tags in the system in step (b) is calculated using at least: (i) the total number f of timeslots in each frame, (ii) the probability p that a tag will reply in a timeslot, (iii) a load factor $\rho_0$ defined as a ratio of a number of tags to frame size, and (iv) the number $z_i$ of zero timeslots for time interval i; and an optimal number n of time intervals in the plurality of time intervals is selected using the equation $$\frac{z_\alpha^2}{\beta^2 f} \frac{\left(\frac{f}{5}-1\right)}{\left(\log\frac{f}{5}\right)^2} \leq n,$$

-continued $$\left(\frac{f}{5}\right)^r - r^2\left(\frac{f}{5} - 1\right) - 1 = 0, \text{ wherein:}$$

f is the total number of timeslots;
p is the probability that a tag will reply in a timeslot;
$\rho$ is a load factor;
Z is the number of zero timeslots in a given frame;
$\alpha$ represents a failure probability; and
$\beta$ represents an error bound.

15. A method for estimating the cardinality of a set of one or more tags in a system that comprises the set of one or more tags and one or more readers, wherein:
    the one or more readers are adapted to transmit a command requesting that each tag that receives the command determine whether to transmit a reply;
    each receiving tag is adapted to determine whether to transmit a reply based on a specified probability level; and
    each receiving tag that determines to transmit a reply (i) selects a timeslot of a frame in which to transmit the reply based on (1) a specified total number of timeslots in the frame and (2) a specified random-number seed and (ii) transmits the reply in the selected timeslot;
the method comprising:
    (a) during each of a plurality of time intervals:
        (a1) transmitting a command requesting that each tag that receives the command determine whether to transmit a reply; and
        (a2) receiving; in one or more timeslots of a frame corresponding to the time interval, replies from one or more tags; and
    (b) providing an estimate of the cardinality of the set of one or more tags in the system based on (i) timeslots in each of the plurality of time intervals that are zero timeslots, wherein a zero timeslot is a timeslot having no received reply, and (ii) the total number of timeslots in each frame, wherein:
the estimate $t_0$ of the cardinality of the set of one or more tags in the system in step (b) is calculated using at least: (i) the total number f of timeslots in each frame, (ii) the probability p that a tag will reply in a timeslot, (iii) a load factor $\rho_0$ defined as a ratio of a number of tags to frame size, and (iv) the number $z_i$ of zero timeslots for time interval i; and
an optimal number of timeslots f is selected using the equations $$\frac{z_\alpha^2}{\beta^2 f} \frac{\left(\frac{f}{5} - 1\right)}{\left(\log\frac{f}{5}\right)^2} \leq n, \left(\frac{f}{5}\right)^r - r^2\left(\frac{f}{5} - 1\right) - 1 = 0,$$

Z is the number of zero timeslots in a given frame;
n is the number of time intervals;
$\alpha$ represents a failure probability;
$\beta$ represents an error bound;
the size of the tag set is bound by upper and lower limits $t_l$, $t_u$, respectively; and
r is a ratio of $t_l/t_u$.

* * * * *

UNITED STATES PATENT AND TRADEMARK OFFICE
CERTIFICATE OF CORRECTION

PATENT NO. : 8,299,900 B2   Page 1 of 1
APPLICATION NO. : 11/824469
DATED : October 30, 2012
INVENTOR(S) : Muralidharan S. Kodialam et al.

It is certified that error appears in the above-identified patent and that said Letters Patent is hereby corrected as shown below:

In the Claims:

- In Column 17, Line 50, please replace "frame'," with --frame,--.

- In Column 20, Lines 63-66 and Column 21, Lines 2-3, please replace $$\frac{Z_\alpha^2}{\beta^2 f} \frac{\left(\frac{f}{5}-1\right)}{\left(\log \frac{f}{5}\right)^2} \leq n,$$

" $\left(\frac{f}{5}\right)^r - r^2\left(\frac{f}{5}-1\right) - 1 = 0$ ', wherein:" with $$n \geq \frac{Z_\alpha^2}{\beta^2}\frac{1}{f}\left(\frac{e^{\nu\rho}-1}{p^2\rho^2}\right),\text{ wherein:}--.$$

- In Column 22, Line 21, please add --, wherein:-- to the end of the formula.

Signed and Sealed this
Sixteenth Day of April, 2013

Teresa Stanek Rea
*Acting Director of the United States Patent and Trademark Office*